United States Patent Office 2,741,607
Patented Apr. 10, 1956

2,741,607

TRIGLYCIDYL CYANURATE AND POLYMERS THEREOF

Theodore F. Bradley, Orinda, and Albert C. Mueller, Berkeley, Calif., assignors to Shell Development Company, New York, N. Y., a corporation of Delaware No Drawing. Application February 23, 1954, Serial No. 412,104

4 Claims. (Cl. 260—248)

This invention relates to cyanuric acid esters of epoxy alcohols, to polymers thereof, and to methods for their production. In particular, the invention pertains to monomer and polymers of triglycidyl cyanurate, and to preparation thereof.

Glycidyl ethers of polyhydric phenols heretofore have been found to be useful as resin-forming materials. While these prior glycidyl ethers give products that generally have excellent properties, they are not wholly satisfactory for certain specialized uses. For example, upon curing the prior ethers with amines or the like, the resinified polymers tend to soften when subjected to elevated temperatures. Further, when the prior ethers are esterified with drying oil acids and these are used in surface coating applications, the dried films tend to discolor under severe weathering conditions. It is therefore a principal object of the present invention to provide a new class of epoxy compounds which overcome such deficiencies. Other objects of the present invention will be apparent from the following description thereof.

We have now discovered a new class of epoxy compounds which yield resinified polymers, unsaturated esters, and related products having exceptionally good properties as compared to those known heretofore. The new compounds of our invention are esters of cyanuric acid having the hydrogen atoms of the acid replaced with the radical linked to the hydroxyl group of an alcohol containing an oxirane group. Triglycidyl cyanurate is a typical member of our new compounds. We have also discovered these new compounds may be prepared in very high yield by reacting cyanuric chloride or bromide with an alcohol containing an oxirane group in the presence of a hydrohalide acceptor such as an inorganic base or a tertiary amine.

The reaction of the epoxy alcohol with the cyanuric halide is preferably executed by mixing at least three mols of the alcohol with a mol of cyanuric chloride or bromide in an inert solvent, and then adding a hydrohalide acceptor to the mixture while agitating and keeping the temperature of the mixture below about 40° C. Various substances are suitable as solvents in which to effect the reaction including chloroform, benzene, toluene, carbon tetrachloride, acetonitrile, heptane, cyclohexane, dioxane, nitrobenzene, and acetone. Illustrative examples of hydrohalide acceptors which can be used are the inorganic bases, e. g., the alkali metal hydroxides (sodium hydroxide, potassium hydroxide, etc.), barium hydroxide, etc., the carbonates of such bases, and the organic bases, e. g., tertiary amines such, for instance, as trimethyl amine, tributyl amine, dimethyl aniline, pyridine, quinoline, etc., quaternary ammonium bases (e. g., tetramethyl ammonium hydroxide, etc.) and the like. The inorganic bases and tertiary amines are preferred hydrohalide acceptors. The most useful hydrohalide acceptor is an aqueous solution of sodium hydroxide.

The new compounds are prepared by the process wherein one reactant is an alcohol containing an oxirane group. For brevity, this reactant is usually referred to herein as an epoxy alcohol by which it is to be understood the epoxy group is an oxirane group

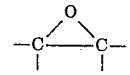

consisting of a three numbered ring having the oxygen atom linked to two vicinal or directly adjacent carbon atoms. The oxirane group is present in plurality in the cyanurate esters of the invention and enables polymerization thereof. The invention is not inclusive of cyanurate esters of alcohols containing an epoxy ring of more than three members such as a tetramethylene oxide group because these are incapable of polymerizing to useful resinous products as do our esters containing oxirane groups.

Representative epoxy alcohols for use in the process include 2,3-epoxypropanol (glycidol), 2,3-epoxybutanol, 2,3-epoxy-2-methylpropanol, 3,4-epoxybutanol, 2,3-epoxypentanol, 5,6-epoxyhexanol-2, 9,10-epoxyoctadecanol, 2,3-epoxycyclohexanol, 2,3-epoxy-3-phenylpropanol, 1,2-epoxy-3,7-dimethyloctene-7-ol-3, 6,7-epoxy-3,7-dimethyloctene - 2 - ol - 1, 1,2 - epoxy - 2,3,3 - trimethyl - 1 - (2-methylpropanol-2)cyclopentane, 2-(2,3-epoxypropyloxy)-ethanol, 12-(2,3-epoxypropyloxy)dodecanol, 1,2-dihydroxy - 3 - (2,3 - epoxypropyloxy) - propane, 2 - hydroxy-1,3 - bis(2,3 - epoxypropyloxy)propane, 2,3 - epoxybutanediol-1,4, 2,3,4,5-diepoxycyclohexanediol-1,6, 2,3-epoxydihydropyran-5-butanol, 4-chloro-2,3-epoxybutanol, 3-epoxyethyl-5-hydroxy-6-methoxycyclohexane, 3-epoxyethyl-5-methoxy-6-hydroxycyclohexane, and the like. The epoxy alcohols may be monohydric or polyhydric, may contain one or more oxirane groups which may be present in an aliphatic chain or carbocyclic structure and may be aliphatic compounds or have aromatic or heterocyclic structure. In general, there may be used any neutral compound containing an alcoholic hydroxyl group and an oxirane group, by neutral reference being had to compounds that are neither acidic nor basic in character. It is desirable that the neutral epoxy alcohols be free of other elements than carbon, hydrogen, oxygen and halogen. The epoxy alcohols employed as reactants may be prepared by a suitable method, such as by dehydrohalogenating a corresponding halo-hydroxyl substituted alcohol. A more general method of preparation is the well-known epoxidation of corresponding olefinic alcohols with peracetic acid.

The epoxyalkanols containing 3 to 6 carbon atoms constitute a preferred group of reactants. In this group, reference is made to such representative compounds as 2,3-epoxypropanol, 2,3-epoxybutanol, 2,3-epoxy-2-methylpropanol, 3,4-epoxypentanol, and 5,6-epoxyhexanol.

The esters of the invention have the hydrogen atoms of cyanuric acid replaced with the radical linked to a hydroxyl group of the epoxy alcohol and are exemplified by the cyanuric acid esters of any of the above-noted epoxy alcohols. The novel esters thus include such typical compounds as triglycidyl cyanurate, tris(3,4-epoxybutyl)-cyanurate, tris(9,10-epoxyoctadecyl)cyanurate, tris(2,3-epoxy-3-phenylpropyl)cyanurate, tris(2,3-epoxycyclohexyl)cyanurate, tris(4-bromo-2,3-epoxybutyl)cyanurate and the like as well as mixed esters such as (2,3-epoxypropyl)-bis(2,3-epoxy-2-methylpropyl)cyanurate and (2,3-epoxypropyl)(2,3-epoxybutyl)(3,4-epoxybutyl)cyanurate obtained by reacting the cyanuric halide with a mixture of two or more appropriate different epoxy alcohols.

The compounds of the invention are generally white crystalline solids at normal temperature (20° C.) although some are liquids.

The process of the invention may be carried out under a variety of conditions. In effecting the reaction between the cyanuric halide and the epoxy alcohol, it is convenient to add the hydrohalide acceptor to a stirred mixture of the two reactants. The rate of addition is regulated so that the temperature of the reaction mixure is preferably mainained below about 40° C. By application of cooling, the temperature can be kept below about 20° C., and best results with high yield of the ester is obtained with the reaction mixture in the range of about 0° C. to 10° C. The use of low temperatures aids preservation of the oxirane groups.

It is preferred to use a mixture of reactants containing about three to five mols of the epoxy alcohol per mol of the cyanuric halide. Although lesser proportions may be used, they are generally undesirable because insufficient alcohol will then be present for complete reaction. Larger proportions than 5:1 may also be used, but is not advantageous.

The hydrohalide acceptor is ordinarily added in such quantity that sufficient is used to combine with all of the hydrogen halide evolved in the reaction of the cyanuric halide with the epoxy alcohol, i. e., about an equivalent quantity or small excess of the acceptor to the cyanuric halide is used. Thus, about 3.1 moles of sodium hydroxide or 1.6 moles of barium hydroxide per mole of cyanuric chloride or bromide is used. The hydrohalide acceptor is preferably added as an aqueous solution or slurry.

As pointed out above, the mixture of reactants is contained in an inert solvent which is preferably substantially water-immiscible. The reactants are usually present as a rather concentrated solution in the solvent so that the solvent constitutes about 50 to 80% by weight of the mixture.

Upon completion of addition of the hydrohalide acceptor and the reaction, the formed salt is washed from the reaction mixture with water. The inert solvent is then substantially evaporated or distilled from the formed ester which is recovered from the residue by any conventional method. It is convenient to recover normally crystalline esters (as are most) by adding a lower dialkyl ether such as ethyl or isopropyl and subjecting the mixture to crystallization with separation of the crystalline product by filtration or centrifugation.

The novel esters are particularly useful for the production of solid resinified products or polymers. The esters are polymerized by adding thereto any of the customary hardening agents for epoxide resins, and heating the mixture at about 50° C. to 200° C. The hardening agents can be either of acidic or basic character and include such typical substances as 2,4,6-tri(dimethylaminomethyl)phenol, ethylene diamine, piperidine, phosphoric acid, butyl dihydrogen phosphate, phthalic anhydride, boron trifluoride, stannic chloride and the like. The polymerizing agents are generally used in amounts of about an added 1% to 15% by weight although larger or smaller amounts may be used if desired.

The solid resinified products or polymers are very heat resistant and are thus useful in applications where retention of strength for a resinified product at elevated temperature is needed. For example, it is desirable to transport chemical fluids in resinous pipe or conduit where advantage is taken of the resistance of the resin against the corrosive nature of the fluids. Since many of these fluids are hot, it is essential that the resin retain strength at the elevated temperature. The resinified products of the invention are excellent for this purpose. The pipe or conduit may have a reinforced composite structure of laminated character using glass, vegetable, animal or synthetic fiber or textile which is bonded together and embedded in the resinified product.

The heat resistant properties of the cyanurate esters may also be imparted to products obtained by resinifying the esters in combination with other resins, particularly epoxy resins. Thus the cyanurate ester may be mixed with glycidyl polyethers of polyhydric phenols or polyhydric alcohols in such weight ratios, for example, of about 5:95 to 95:5 of ester to polyether, and the mixture subjected to cure with the aid of an epoxy resin hardening agent. Any of the various glycidyl polyethers or epoxy resins such as are described, for instance, in U. S. Patent No. 2,651,589 are suitable for this purpose. Excellent results are obtained by copolymerization of the cyanurate ester with diglycidyl diether of 2,2-bis(4-hydroxyphenyl)propane. If desired, other resins may be used in place of or in combination with the epoxy resins, typical other resins being phenol-aldehyde resins, urea-aldehyde resins, melaminealdehyde resins, alkyd resins, polyamide resins and the like.

Very useful products are also obtained from the cyanurate esters by subjecting them to esterification with carboxylic acids. Esters of this type have excellent stability against discoloration and deterioration. Any of the various monocarboxylic acids are suitable for this purpose including saturated, unsaturated, aliphatic and cyclic acids such as acetic acid, stearic acid, naphthenic acid, benzoic acid, rosin and particularly acids of natural oils such as linseed oil, soybean oil, dehydrated castor oil, tung oil and the like. Esterification is usually effected by heating a mixture of cyanurate ester with up to an equivalent amount of the acid and removing the water of esterification by distillation. Mixed esters are obtained by using two or more different carboxylic acids. The esters obtained from drying or semi-drying oil acids are capable of drying or baking as films to form useful protective coatings.

The following examples are given for the purpose of illustrating the invention and its unexpected advantages, but they are not to be construed as limiting the scope of the invention to details described therein.

*Example I*

About 55.5 g. of cyanuric chloride were stirred with 103 g. of glycidol and 300 cc. of chloroform. The temperature of the mixture was lowered to about 3° C. whereupon a solution of 37.5 g. of sodium hydroxide in 45 g. of water were slowly added with stirring during 3 hours' time while keeping the temperature below 10° C. The reaction mixture was stirred for an additional hour and then about 200 cc. of water was added. The resulting mixture was filtered to remove a small amount of black gummy tar. The filtrate separated into two layers. The lower chloroform layer was washed four times with 50 cc. portions of water which were discarded. The washed chloroform layer was then stripped under vacuum to a temperature of 110° C. at 1 mm. pressure to give a residue product of triglycidyl cyanurate in amount of 78 g. Analysis of the water white, very viscous product gave an epoxy value of 0.907 equivalents per 100 g. (theory 1.01), and 13.85% nitrogen (theory 14.14%).

*Example II*

Triglycidyl cyanurate prepared as described in Example I was polymerized and cured with the aid of 2,4,6-tri(dimethylaminomethyl)phenol. Five per cent of the amine was added to the ester and the mixture was resinified by heating as given in the table below. For purposes of comparison of hardness of the resinified product, there were also prepared resinified products from the glycidal ethers listed in the table, each being cured with the aid of an added 5% of the same amine and under the given conditions. To ensure completion of cure of all the resins, each was further heated at 200° C. for 3 hours. After cooling, the resins were then immersed in an oil bath and the temperature was gradually increased with readings of the Barcol hardness being made at intervals. From the tabulated data below, it will be observed that the resinified triglycidyl cyanurate has remarkable retention of hardness at elevated temperature.

| | Curing Conditions | Barcol Hardness at °C | | | | | |
|---|---|---|---|---|---|---|---|
| | | 25 | 56 | 68 | 77 | 87 | 100 |
| Triglycidyl cyanurate | 7½ hrs. at 65° C. | 57 | 49 | 46 | 44 | 39 | 32 |
| Triglycidyl triether of pyrogallol. | 4 hrs., 65° C., 2½ hrs. at 100° C. | 38 | 32 | 25 | 23 | 18 | 16 |
| Diglycidyl diether of resorcinol. | 6 hrs. at 65° C. | 26 | 13 | 5 | 0 | 0 | 0 |
| Diglycidyl diether of bis-phenol. | 3 hrs., 65° C.; 3 hrs., 100° C. | 24 | 10 | 2 | 0 | 0 | 0 |

*Example III*

A solution of 555 g. of cyanuric chloride in 2 liters of chloroform containing 1030 g. of glycidol was prepared at room temperature. The mixture was cooled to 0–5° C. and a solution of 375 g. of sodium hydroxide in 454 g. of water was very slowly dropped in with vigorous stirring (during a 4-hour period) while keeping the reaction mixture cool. After the addition was complete, the stirring was continued for another 30 minutes and then two liters of water was added to dissolve the precipitated salt and unchanged alkali. A very small amount of black tarry material was filtered off which appeared to come from impurities in the cyanuric chloride. The filtered mixture separated into two layers and the aqueous layer was discarded. The chloroform layer was washed with water until the washings were neutral. The chloroform solution was then concentrated at 25° C. in vacuo to a final pressure of about 1–2 mm. About one liter of diethyl ether was added to the resulting thick syrup and the mixture chilled, whereupon the product crystallized. The crystals were separated by filtration, washed twice with diethyl ether and dried at room temperature in vacuo. An essentially quantitative yield of triglycidyl cyanurate was obtained as a white free-flowing crystalline powder which analyzed as follows:

| | Found | Theoretical |
|---|---|---|
| Percent C | 48.0 | 48.4 |
| Percent H | 5.0 | 5.1 |
| Percent N | 14.0 | 14.1 |
| Percent Cl | 0.65 | 0.0 |
| Epoxide Value, eq./100 g. | 0.924 | 1.01 |

The product began to soften at 30° C. and was completely melted in the range of 53–60° C. It was soluble in acetone, chloroform and hot water, and insoluble in diethyl ether, cyclohexane and n-heptane.

*Example IV*

Glass cloth laminates using cured triglycidyl cyanurate of Example III as bonding material have excellent retention of strength at elevated temperatures. A glass cloth laminate was prepared containing 16 plies of 181 cloth and using a mixture of the triglycidyl cyanurate containing an added 4% of dicyandiamide as curing agent. Cure was effected by heating in a press with platens at about 240° F. For purpose of comparison, a corresponding laminate was also prepared using a mixture of triglycidyl triether of pyrogallol also containing 4% of dicyandiamide. The laminates were subjected to the ultimate flexural strength test No. 1031 described in Federal Specifications for Plastics, Organic: General Specifications, test methods L-P-406a, January 25, 1944. The flexural strengths were measured at 77° F. and also at the elevated temperature of 300° F. The results are tabulated below:

| Resin Forming Compound | Ultimate Flexural Strength (p. s. i.) | |
|---|---|---|
| | at 77° F. | at 300° F. |
| Triglycidyl cyanurate | 69,400 | 64,600 |
| Triglycidyl triether of pyrogallol | 84,000 | 8,000 |

*Example V*

Triglycidyl cyanurate in amount of 60 g. (1.2 equivalents) was heated and esterified with 310 g. (1.02 equivalents) of soybean fatty acids in 5 hours at about 205–235° C. with continuous removal of water using a small amount of xylene as azeotroping agent. The resulting ester freed of xylene had an acid number of 10 and a Gardner-Holdt viscosity of E–F. As drier, there was added 0.05% cobalt as the naphthenate salt.

For comparison, a soybean fatty acid ester of a glycidyl polyether of bis-phenol was prepared. The glycidyl polyether was the alkaline condensate of about 5 mols of epichlorhydrin with 4 mols of bis-phenol or 2,2-bis(4-hydroxyphenyl)propane having a Durrans' softening point of 100° C. and an equivalent weight to esterification of 175. The ester was prepared using 550 g. of acid and 450 g. of polyether. The ester was used as a 50% solution in a high-aromatic petroleum thinner, the solution also containing 0.05% cobalt on ester basis as naphthenate salt.

The two esters were doctored on glass panels with a 5 ml. blade, and then were permitted to dry and harden for 7 days. The dried films were then placed in an Acme Weatherometer. After 160 hours exposure, the film from the cyanurate ester was essentially colorless while the other film had yellowed severely.

We claim as our invention:

1. A process for the production of an ester of cyanuric acid which comprises mixing about 3 mols of an epoxyalkanol wherein the epoxy is an oxirane group with a mol of cyanuric chloride, and then adding about 3 mols of alkali metal hydroxide to the mixture while maintaining the temperature of the reaction mixture within the range of about 0° C. to 25° C.

2. A process for the production of an ester of cyanuric acid which comprises mixing about 3 mols of glycidol with a mol of cyanuric chloride, and then adding about 3 mols of sodium hydroxide to the mixture while maintaining the temperature of the reaction mixture within the range of about 0° C. to 25° C.

3. Cyanuric acid tris(epoxyalkyl) triester wherein the epoxy is an oxirane group.

4. Triglycidyl cyanurate.

References Cited in the file of this patent
UNITED STATES PATENTS

| 2,510,564 | Dudley | June 6, 1950 |
| 2,521,950 | Schildknect | Sept. 12, 1950 |
| 2,527,316 | Mackay | Oct. 24, 1950 |
| 2,537,816 | Dudley | Jan. 9, 1951 |
| 2,555,876 | Crozier et al. | June 5, 1951 |

OTHER REFERENCES

Spielman et al.; article in Jour. Am. Chem. Soc., vol. 73, April 1951, pp. 1775–76.